ވ2,788,281
Patented Apr. 9, 1957

2,788,281

INCREASING THE FLAVOR AND OTHER QUALITIES OF FOODS

Dante G. Guadagni, Lafayette, Calif., assignor to the United States of America as represented by the Secretary of Agriculture No Drawing. Application August 11, 1954,
Serial No. 449,281

4 Claims. (Cl. 99—192)

(Granted under Title 35, U. S. Code (1952), sec. 266)

A non-exclusive, irrevocable, royalty-free license in the invention hereindescribed, for all governmental purposes, throughout the world, with the power to grant sublicenses for such purposes, is hereby granted to the Government of the United States of America.

This invention relates to and has among its objects the provision of methods for preparing foods in which the flavor and other desirable attributes of the foods are increased above their natural levels. In particular the invention concerns a procedure in which a frozen food is subjected to a curing or conditioning operation whereby to increase the quality of the food particularly as regards flavor, nutritive properties, solids content, and so forth. Further objects and advantages of the invention will be obvious from the description herein.

It is well known that various foods such as fruits, vegetables, meats, etc. may be preserved by freezing. It is desirable in many cases to intensify the flavor of the food over and above the natural level. As an example of such a situation, reference is made to the freezing of red sour cherries. This product is commercially produced by packing the cherries, pitted or whole, in cartons together with about one-quarter of their weight of sucrose or an equivalent amount of syrup (sugar dissolved in water). The container is then closed and subjected to freezing. To prevent browning, ascorbic acid may be added to the sugar or syrup or the fruit may be pre-treated with sulphur dioxide or other sulphiting agent such as sodium bisulphite. The resulting product is a wholesome and nutritious food but is more adapted for used in pies and similar cooked or baked products than for direct eating. The point is that the cherries themselves are quite tart. Further, their tartness is psychologically intensified to the consumer's palate when the product is eaten because of the sharp contrast between the tartness of the fruit and the sweetness of the surrounding syrup. The industry has long sought for a method by which the cherries could be internally sweetened to obviate this contrast in taste between fruit and syrup. Thus various techniques have been advocated to accomplish such an end. For example, one recommended procedure is to apply dry sugar or syrup to the cherries and then permit the mixture to stand for some time prior to freezing. Such a technique will cause some of the sugar to enter the fruit tissue but the rate of internal sweetening which occurs is extremely slow and usually such standing for a day or two will increase the sugar content of the fruit by about 5% at the maximum. Another technique known in the art involves subjecting a mixture of the fruit and syrup to a vacuum followed by release of the vacuum whereby to cause syrup to be drawn into the fruit tissue. This technique gives a greater increase in internal sugar content but is truly effective only with fruits like apples and pears, the tissue of which normally contains a substantial proportion of air whereby the space formerly occupied by air can be filled with the syrup. However, even with vacuum impregnation it is impossible to bring the sugar content of the fruit up to the same level as the sugar content of the syrup. As a result, tart fruit impregnated with syrup will exhibit a strong taste contrast as compared with the syrup surrounding it.

It has now been found that the problem outlined above can be alleviated in a simple yet effective manner. Briefly described, this is accomplished by first preparing the frozen fruit in the conventional manner, that is, the fruit is packed into a container together with dry sugar or syrup. The sugared fruit is then frozen in the usual way. After the product has been frozen it is removed from the freezer and subjected to what is termed a conditioning operation. This operation involves holding the product in a thawed or unfrozen state, preferably at a temperature just above its freezing point, for a substantial period of time. After the conditioning operation the product may be consumed or otherwise utilized without further treatment. If the product is to be stored, it is re-frozen and maintained in frozen storage until used.

During the conditioning operation, the fruit is in contact with the syrup surrounding it and sugar will diffuse from the syrup into the fruit tissue. This conditioning is so effective that the sugar content of the fruit will become equal to the sugar content of the syrup. Thus originally the fruit has a lower sugar concentration than the surrounding syrup. As the conditioning proceeds, sugar diffuses into the fruit tissue with the result that the sugar content of the fruit increases whereas the sugar content of the syrup decreases. Finally an equilibrium point is reached at which the sugar contents of the tissue and the syrup are equal. It is to be emphasized that such a result, that is, such exhaustive absorption of sugar by the fruit tissue cannot be obtained by the previously known method, that is, where the untreated fruit is simply allowed to stand in contact with sugar or syrup prior to freezing. Thus my researches have shown that the freezing must take place prior to the conditioning operation to obtain a high degree of sugar absorption into the fruit tissue. The reason for the criticality of freezing prior to conditioning is not understood and cannot be scientifically explained. However, regardless of any theoretical considerations, the plain fact of the matter is that the process in accordance with this invention results in absorption of large amounts of sugar whereas in the known method only minor amounts of sugar are absorbed.

In applying the process of this invention to raw solid fruit in order to sweeten it, a preferred procedure involves conditioning the fruit while it is in intimate contact with an aqueous solution containing at least 20% sugar, the conditioning being continued until the fruit and the solution each contain substantially the same concentration of sugar, within the range of about from 20 to 30%, whereby the fruit and the liquid have substantially the same degree of sweetness. The resulting mixture of fruit and liquid is then preferably frozen and maintained in frozen condition until consumed.

Although the above discussion is concerned with the absorption of sugar into the fruit tissue it is to be understood that this invention is not restricted to this particular phase. Actually, this invention encompasses the treatment of any solid food to cause the food to absorb any desired soluble food ingredient whether such food ingredient partakes of the nature of a flavoring agent, a nutritive element, a coloring material, a preserving agent, a tenderizing agent, a flavor-intensifying agent, a firming agent, and so forth. Mixtures of food ingredients may of course be applied as desired.

A more complete description of processes within the scope of this invention is as follows:

Fresh produce such as fruit, vegetables, meat, etc. is first subjected to the usual preparatory steps such as washing, peeling, pitting, slicing, etc. all as well known in the art. The preparative steps to be employed will of course depend on the nature of the produce and the type of product desired. For example, fruit such as apples and pears are usually washed, peeled, cored and sliced. Peaches and apricots are washed, peeled, pitted, and sliced. Small fruit such as berries, grapes, etc. are merely washed. Vegetables such as beans, squash, broccoli, spinach are washed and cut into convenient pieces. Root vegetables such as carrots, beets, potatoes, etc. are washed, peeled, and cut into pieces. Meats are subjected to trimming to remove excessive fat, bones, etc. then cut into pieces. Since the impregnation of the solid food with the food ingredient in accordance with this invention involves a diffusion process, the size of the food pieces will have an effect on the distribution of the food ingredient within the solid food. Thus, when the food is reduced to small pieces, the path of diffusion is decreased with the result that the impregnation will be more uniform throughout the internal structure of the food. Thus to promote uniform impregnation in a reasonable time, it is preferred that where necessary the food be reduced to slices, dice, slabs, or other pieces in which the smallest dimension is not over about 1.5 inches. However, it may be noted that where the conditioning time is extended, uniform impregnation will be obtained regardless of the size of the food pieces.

Where necessary the food may be subjected to such treatments as: blanching in steam or hot water to inactivate enzymes; treatment with agents such as sulfur dioxide, sodium sulphite, sodium bisulphite, or ascorbic acid to prevent browning; complete or partial cooking to tenderize the food, etc.

The solid food units, that is, whole small fruit, or pieces of fruit, vegetables, or meats, are placed in a suitable container such as a can, carton, etc. Over the contents of the container is then poured a quantity of an edible liquid containing the selected food ingredient, for example, sugar dissolved in water. In many cases the food ingredient may be added in a dry state. In such case a mixing of the dry ingredient with the food will develop a solution of the ingredient in juice issuing from the solid food. Such technique is convenient with fruits and similarly juicy foods.

As noted above, the process of this invention may be utilized for impregnating a solid food with any desired solid food ingredient or mixture of ingredients. Examples of food ingredients which may be incorporated in water or other edible liquid to form the impregnating liquid are set forth below:

Sweetening agents: sucrose, dextrose, fructose, maltose, invert sugar, corn syrup, molasses, maple sugar or syrup, etc. For the so-called "dietetic" foods, saccharin or sodium cyclamate may be used. For the impregnation of fruits, particularly desirable sweetening agents are the concentrated fruit juices and especially full-flavored concentrates, that is, those in which the volatile essences usually lost in evaporative techniques are recovered by condensation or other techniques and returned to the concentrate. Fruit juice concentrates are desirable in that they not only add their sweetening effect but also the characteristic fruity taste so that the flavor of the treated fruit is intensified. Novel effects may be obtained by using a full-flavored juice concentrate derived from one fruit for impregnating solid units of a different fruit.

Other flavoring agents: salt, monosodium glutamate, protein hydrolysates, soy bean sauce, meat broth, vinegar, pickling ingredients, alcoholic extracts such as vanilla, lemon, mint, etc., soluble extractives from coffee, tea, or cocoa, fruit or vegetable juices, wines, synthetic flavorings, such as vanillin and methyl anthranilate, natural fruit essences such as those recovered by condensation from the vapors evolved in the evaporation of fruit juices, etc.

Nutritive substances: vitamins, vitamin precursors, mineral salts, proteins, solubilized starch, sugars, etc.

Coloring materials: dyes suitable for food use, juices from highly pigmented fruits or vegetables, for instance Concord grape juice, extractives from pigmented edible plant materials, etc.

Preserving agents: browning inhibitors such as sodium sulphite, sodium bisulphite, ascorbic acid, lemon juice, etc. Fat-stabilizing agents such as nordihydroguaiaretic acid, propyl gallate, tertiarybutylated hydroxyanisole, ethyl hydrocaffeate, etc. Agents for preventing or inhibiting microbial spoilage such as sodium benzoate, sodium parahydroxybenzoate, ethyl vanillate, antibiotics, etc.

Agents for firming the texture of fruits and vegetables, for instance, calcium chloride, pectin, low-methoxyl pectins, methyl cellulose, etc.

Agents for softening the tissue of plant materials, meats, etc.: enzymes such as cellulase, polygalacturonase, papain, etc.

To promote the diffusion of the food ingredient into the solid food units during the conditioning operation, the concentration of the food ingredient in the edible liquid should be greater than the concentration of the same food ingredient within the solid food. For example, if the solid food to be treated contains 5% sugar then the concentration of sugar in the edible liquid should be higher than 5% thus to provide a driving potential for the diffusion process.

The containers having within them the units of solid food in contact with the edible liquid containing a food ingredient are then sealed and frozen. The freezing may be accomplished in any of the devices available for freezing purposes, for example a plate freezer or tunnel freezer.

The frozen product directly after freezing or after storage at freezing temperatures, is then subjected to the conditioning step. A simple way of doing this involves placing the containers prepared as above described in a room maintained at a temperature just above the freezing point of the food such conditions being maintained for a substantial period to allow the food ingredient to diffuse into the solid food units. The temperature of conditioning to be used with any particular food will depend largely on the type of food and particularly on its content of soluble solids. Thus for example foods low in soluble solids such as cabbage, lettuce, broccoli, etc. have freezing points at or near 32° F. and with such foods the conditioning temperature may be just above 32° F., for instance, 32.5° F. Other foods which are higher in solids content such as cherries, prunes, apricots, peaches, apples, grapes, etc. have freezing points below 32° F. and in such cases the conditioning may be carried out at temperatures of 32° F. or below, depending on the freezing point of the product in question. In general, conditioning temperatures from about 25° to 35° F. are preferred, depending on the nature of the food being treated. Temperatures higher than 35° F. may be used but to avoid danger of microbial spoilage during the conditioning operation, it is preferred to use a temperature just above the freezing point of the food, that is, about 0.5 to 5 degrees F. above the freezing point. Since the penetration of the food ingredient into the solid food involves diffusion, sufficient time must be allowed for the penetration to take place. Obviously the time for penetration will depend on the degree of penetration desired and on the nature of the food, that is, its porosity or denseness, the size of the food units, etc. To secure maximum penetration the conditioning is usually continued for a period from several hours to several days.

After the conditioning operation is completed, the food may be treated in several ways. Thus for example, the impregnated food with the accompanying edible liquid may be frozen and maintained in frozen storage. If desired, the solid food units may be separated from residual edible liquid and the solid units frozen and maintained in frozen storage until needed for consumption. In the alternative, the separated units may be subjected to dehydration to reduce their moisture level to a low level so that the product will be self-preserving. The impregnated food units with or without the residual edible liquid may also be preserved by canning. Other preservative methods such as pickling, curing, smoking, fermentation, etc. may be applied to the impregnated food units. If the impregnated food is not to be preserved it may be consumed directly or used directly in the preparation of such products as pies, stews, creamed products, and so forth.

As explained above, in the preferred modification of this invention the solid food units enveloped with an edible liquid containing a food ingredient are frozen then subjected to the conditioning operation. In an alternative modification, the food units per se are frozen then subjected to the conditioning step while they are maintained in contact with the edible liquid. As an example, sour cherries are washed, pitted, and frozen. The frozen cherries are then placed in a vessel and mixed with sucrose solution. The resulting mixture is then subjected to the conditioning operation as above described to cause the sugar to penetrate into the cherries.

The invention is further illustrated by the following examples:

*Example I*

A lot of fresh strawberries were washed then sliced into pieces about ⅜ inch thick. The slices were then mixed with sucrose in the proportion of 4 lbs. fruit to 1 lb. sucrose. During this mixing the sucrose was dissolved by the strawberry juice so that the final mixture consisted of strawberry slices surrounded by syrup containing water, sucrose, and fruit extractives. The resulting mixture was placed in cartons, the cartons being then sealed and placed in a plate freezer at minus 20° F.

After the product was frozen, it was removed from the freezer and placed in a refrigerator maintained at 30° F. Packages of the product were opened at various times and the fruit and syrup separated by draining through a sieve. The soluble solids content (largely sucrose) in the fruit and the syrup was then determined by the use of a refractometer. The results obtained are set forth below:

| Period of storage at 30°F., days | Soluble solids content, expressed as percent of sucrose | |
|---|---|---|
| | Fruit | Syrup |
| 0 | 15 | 35 |
| 1 | 20.6 | 27 |
| 3 | 22.5 | 25 |
| 6 | 23.5 | 24 |

*Example II*

Red sour cherries were washed and pitted then placed in cans. The fruit in the cans was covered with a 60° Brix solution of sucrose in water. The cans were sealed then frozen at minus 10° F. The cans of frozen product were then placed in a refrigerator maintained at 30° F., and samples were withdrawn at intervals and tested as described in Example I. The following results were obtained:

| Product | Period of storage at 30°F., days | Soluble solids content, expressed as percent of sucrose | |
|---|---|---|---|
| | | Fruit | Syrup |
| A | 0 | 16 | 45 |
| B | 1 | 22.8 | 26 |
| C | 3 | 26 | 27.6 |

In addition to the above tests, the products conditioned at 30° F. (B and C) and the product which had not been conditioned (A) were tasted. It was found that products B and C were sweet and there was essentially no difference in sweetness between the fruit and the syrup. In the case of product A, the fruit was very tart whereas the syrup was very sweet.

Having thus described the invention, what is claimed is:

1. A process for impregnating a solid food, selected from the group consisting of fruits, vegetables, and meats, with a food ingredient which comprises freezing the food, then directly subjecting the food to an impregnation treatment wherein the food is maintained in a thawed condition at a temperature just above its freezing temperature, within the range from about 25° F. to about 35° F., while it is in intimate contact with an edible liquid containing a food ingredient in a concentration greater than the concentration of the same food ingredient in the food, the contact being for a substantial period of time whereby to cause penetration of the food ingredient into the food.

2. The process of claim 1 wherein the impregnated food is re-frozen and maintained in frozen storage.

3. A process for preparing internally-sweetened frozen fruit which comprises intimately contacting an aqueous solution containing at least 20% sugar with units of raw, fresh, solid fruit having their natural moisture content, the sugar concentration in the aqueous solution being greater than the sugar concentration in the fruit, said fruit having been previously frozen and then directly thawed to render the fruit tissue receptive to sugar impregnation, maintaining said contact at a temperature just above the freezing point of the fruit, within the range from about 25° F. to about 35° F., for a period of time sufficient to cause the sugar to impregnate the fruit tissue and thus sweeten it and thereafter freezing the so-treated fruit and maintaining it in frozen storage.

4. A process for preparing internally-sweetened, frozen fruit which comprises forming a mixture of an aqueous sugar solution containing at least 20% sugar and units of raw, fresh, solid fruit which normally contains less than 20% sugar, said fruit having its natural moisture content, freezing said mixture, then directly subjecting it to an impregnation treatment wherein said mixture is maintained at a temperature just above the freezing point of the fruit, within the range from about 25° F. to about 35° F., for a period of time sufficient to cause the sugar to impregnate the fruit tissue to such an extent that the fruit and the liquid each attain substantially the same concentration of sugar, whereby said fruit and liquid have substantially the same degree of sweetness, thereafter freezing the so-treated mixture of fruit and liquid and maintaining it under frozen storage.

References Cited in the file of this patent
UNITED STATES PATENTS

| | | |
|---|---|---|
| 2,317,397 | Noyes | Apr. 27, 1943 |
| 2,340,145 | Rogers | Jan. 25, 1944 |
| 2,419,877 | Birdseye | Apr. 29, 1947 |
| 2,443,866 | Noyes | June 22, 1948 |
| 2,511,609 | Weast | June 13, 1950 |